United States Patent Office 3,086,954
Patented Apr. 23, 1963

3,086,954
CYANOGUANIDINE AS A VULCANIZATION AGENT FOR SILICONE RUBBER
Keith E. Polmanteer, Midland, and Virgil L. Metevia, Bay City, Mich., assignors to Dow Corning Corporation, Midland, Mich., a corporation of Michigan
No Drawing. Filed Aug. 17, 1961, Ser. No. 131,987
19 Claims. (Cl. 260—37)

This invention relates to the art of using cyanoguanidine as a vulcanizing agent for certain silicone elastomers.

Silicone rubber is now a well-known article of commerce. It is available in a wide variety of different types and has been prepared from a host of different organosiloxane polymers or copolymers with various fillers and curing catalysts. In the past, however, even the best of the silicone rubbers had poor tear strengths. When high tear strengths were required, silicone rubber could not be used, even though a rubber possessing a thermal stability of silicone rubber was needed. For example, the poor tear strength of silicone rubber has precluded its use in high speed airplane tires.

In the past, two difficulties have been encountered in the peroxide vulcanization of silicone rubber. One of these difficulties has been the poor vulcanization obtained in the center of thick sections (e.g., one inch sections) of silicone rubber. This resulted in a finished rubber part having varying physical properties throughout the part. For example, the durometer and tensile strength would be much lower in the center of the part than near the surface. In some instances, the interior of very thick samples would be completely unvulcanized. It has been theorized that this was due primarily to the chemical action of the decomposition products of the peroxide.

The second difficulty is that oxygen inhibition occurs when peroxide is used to vulcanize silicone rubber in the presence of oxygen. For example, peroxide vulcanization of silicone rubber in an air-oven at 150° C. will result in a vulcanized interior while the surface will not be vulcanized at all. This results in a poor product.

It is an object of the present invention to provide an improved silicone rubber, and particularly to provide a rubber with improved tear strength. It is a further object to provide a method whereby deep sections of silicone rubber stock can be vulcanized so that uniform properties are obtained throughout the section. It is a further object to obviate the necessity of excluding air while vulcanizing a silicone rubber stock. Another object is to provide a silicone rubber with very high tensile strengths.

It has been found that these objects can be obtained by a heat-curable composition of matter consisting essentially of (1) Hydroxylated organosilicon polymers selected from the group consisting of
   (A) Organopolysiloxanes in which the organic groups are selected from the group consisting of monovalent hydrocarbon radicals and halogenated monovalent hydrocarbon radicals, and
   (B) Polymers containing units of the structure

wherein X is a divalent radical composed of carbon and hydrogen atoms and no more than one oxygen atom, said oxygen atom being present in a

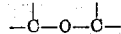

group and Y is a monovalent hydrocarbon radical, said organosilicon polymers having a silicon bonded OH content of at least 2OH per molecule and having an average of from 1.95 to 2.05 monovalent organic groups attached to silicon per silicon atom and having an average of at least 400 silicon atoms per molecule, (2) At least 10 percent by weight based on the weight of (1) of a modified silica filler comprising finely divided hydrophobic solid particles having a surface area of at least 100 m.$^2$/g., each of said particles consisting essentially of a polymeric siliceous substrate consisting essentially of
   (A) From 50 to 100 inclusive mol percent of units of the formula $SiO_2$, and
   (B) From 0 to 50 inclusive mol percent of units of the formula $RSiO_{1.5}$, wherein R is selected from the group consisting of alkyl radicals of less than 6 carbon atoms and phenyl, there being
   (C) Organosilyl units selected from the group consisting of R'R"Si= and R'$_2$R"Si—, wherein R' is selected from the group consisting of alkyl radicals of less than 6 carbon atoms and phenyl, and R" is selected from the group consisting of alkyl radicals of less than 6 carbon atoms, 3,3,3-trifluoropropyl and phenyl radicals, in an amount such that the molar ratio of (C) units to total (A) and (B) units is not in excess of 0.6, said organosilyl units being attached to silicon atoms in the surface of said substrate through SiOSi linkages, and (3) At least 0.1 percent by weight based on the weight of (1) of cyanoguanidine.

This invention is also particularly concerned with the rubber which is obtained when the above-described heat-curable composition of matter is "cured" or "vulcanized." This composition can be cured by heating, preferably in the range of 160° to 200° C. for 10 to 15 minutes. The terms "rubber stock" and "heat curable composition of matter" are used to refer to the uncured mixture from which the final rubbery product can be obtained.

The organosilicon polymers that can be used herein must contain at least 2 OH per molecule. The polymers can be endblocked with hydroxyl groups or these groups can be bonded to non-terminal silicon atoms in the polymer. Preferably the hydroxyl groups are on each end of each of the polymer molecules. The organosilicon polymers that can be used must have an average of at least 400 silicon atoms per molecule. Thus, the polymers can be liquids or nonflowing benzene-soluble gums. The particular physical state of the polymer will vary, depending upon the end use of the elastomer. For instance, fluid polymers are prepared for such applications as coating and potting. On the other hand, when excellent tensile and tear strengths are desired, high molecular weight non-flowing soluble gums are preferable. There must be an average of from 1.95 to 2.05 monovalent organic groups attached to silicon per silicon atom. The organosilicon polymer can contain relatively minor amounts of monoorgano or triorganosilyl units. Such units can only be present in relatively minor amounts so that the average degree of substitution of from 1.95 to 2.05 organo radicals per silicon atom is maintained.

Any conventional hydroxyl containing organopolysiloxane can be used in this invention. The organic groups attached to the silicon atoms can be any monovalent hydrocarbon radical. Specific examples of these groups which are operative in this invention are alkyl groups; such as methyl, ethyl, tert-butyl and octadecyl; alkenyl groups such as vinyl, allyl and butadienyl; cycloalkyl groups such as cyclobutyl, cyclopentyl and cyclohexyl; cycloalkenyl groups such as cyclopentenyl and cyclohexenyl; aryl groups such as phenyl and xenyl; aralkyl groups, such as benzyl and xylyl and alkaryl groups such as tolyl. The organic group can also be any of the above types of radicals with halogen atoms attached thereto, e.g., chloromethyl, bromophenyl, trifluorotolyl, $CF_3CH_2CH_2$ and $C_3F_7CH_2CH_2$. These polysiloxanes are well known materials.

The siloxane can be a homopolymer (i.e., containing only one species of siloxane unit), or a copolymer containing two or more different species of siloxane units. The siloxane can also be a mixture of any combination of homopolymers and/or copolymers. In the siloxane, either one or different types of organic groups can be attached to each silicon atom. Although homopolymers, such as hydroxyl endblocked phenylmethylpolysiloxane, can be used in this invention, it is preferred that the organopolysiloxane contain at least 75 mol percent of units of the formula $(CH_3)_2SiO$ with the remaining units being any of the following:

$$(C_6H_5)_2SiO$$
$$(F_3CCH_2CH_2)(CH_3)SiO$$
$$(CH_3)(CH_2=CH)SiO$$

and $$(C_6H_5)(CH_3)SiO$$

Such hydroxylated siloxane can be prepared by any convenient method for preparing such siloxanes. These include heating cyclic siloxanes with steam under pressure and the careful hydrolysis of alkoxysilanes under relatively neutral conditions. Another method is that of preparing the corresponding chlorosilanes and then hydrolyzing the chlorine.

The organosilicon polymer can also be a polymer containing units of the structure

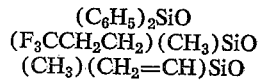

wherein X is a divalent radical composed of carbon and hydrogen atoms and no more than one oxygen atom, said oxygen atom being present in a

group and Y is a monovalent hydrocarbon radical. Specific examples of such monovalent hydrocarbon radicals are listed in the description of the polysiloxanes. As mentioned earlier, there must be from 1.95 to 2.05 monovalent organic groups (in this case Y units) attached to silicon per silicon atom.

Specific examples of X are methylene, ethylene, p-phenylene, 4,4-diphenylene, p-xylylene, 4,4'-diphenylene ether, and 4,4'-dimethylenediphenyl ether. These polymers can be homopolymers (i.e., the polymer only contains the above silcarbane units), or the polymers can be block copolymers containing both blocks of the above units and blocks of the previously defined siloxane units. Silarylenesiloxane block copolymers are disclosed in copending application No. 51,594, filed August 24, 1960. These polymers yield elastomers with unusually high tensile strengths.

The surface area of the filler is quite critical and must be at least 100 square meters per gram as measured by nitrogen adsorption with the method described in ASTM Special Technical Bulletin No. 51, page 95 et seq. (1941). A satisfactory elastomer is not obtained if fillers below 100 square meters per gram are used. The preferred surface area is between 300 and 400 square meters per gram. There is no critical maximum for the silica surface area, which can be 900 square meters per gram or more.

The modified silica fillers can be prepared from any reinforcing silica filler having a surface area of at least 100 square meters per gram (e.g., fume silicas, silica aerogel, hydrogels, organogels and xerogels). The fillers can be prepared from fillers that are composed of all $SiO_2$ units or they can be composed of from 50 to 100 mol percent of $SiO_2$ and 0 to 50 mol percent $RSiO_{1.5}$, wherein R is an alkyl radical of less than 6 carbon atoms or phenyl. Thus, R can be methyl, ethyl, propyl, butyl or pentyl radicals. If $RSiO_{1.5}$ units are present, these fillers are commonly called cogels. The methods of making these cogels are well known in the art.

Organosilyl units are chemically bonded to silicon atoms in the surface of the substrate through SiOSi linkages. These organosilyl units can be either $R''R'Si=$ or $R'_2R''Si-$. R' and R'' can be any alkyl radical of less than 6 carbon atoms or phenyl. Thus, R' and R'' can be methyl, ethyl, propyl, or butyl. The silica filler can be coated with diorganosilyl, triorganosilyl groups or mixtures of such groups with or without limited amounts of monoorganosilyl groups. The organosilyl unit can also contain one 3,3,3-trifluoropropyl group per silicon atom. Specific examples of organosilyl groups which can be attached to the surface of the silica through SiOSi linkages are dimethylsilyl, trimethylsilyl, dimethylphenylsilyl, 3,3,3-trifluoropropyldimethylsilyl, dimethylbutylsilyl and triethylsilyl.

The ratio of organosilyl units to total $SiO_2$ and $RSiO_{1.5}$ units is 0.6 or less. Best results are obtained when the surface of the substrate is saturated with organosilyl units. The term "saturate" means that essentially all the reactive sites (presumably SiOH groups) on the surface of the silica substrate have been covered with organosilyl groups. The precise amount of organosilyl groups needed to "saturate" the surface of the substrate will depend on the type of filler, surface area of the filler, type of treatment of the filler, and numerous other factors. Depending on the above factors, the surface of the filler can be saturated at a value below 0.6. Although preferable, it is not essential that the surface be saturated with organosilyl groups. However, it is necessary that there be at least a few organosilyl units chemically bonded to the surface of the filler. These fillers can be prepared by any suitable method. Methods of preparing satisfactory fillers are disclosed in U.S. Patent 2,863,846 of Leslie J. Tyler and his copending application 460,773 filed October 6, 1954.

One suitable method is to prepare a finely divided silica such as one may obtain by burning a volatile silane, and thereafter treat the silica with a reactive organosilicon compound which will provide the specified range and kinds of organosilyl units attached to the surface of the silica substrate. Chlorosilanes, silanols, and alkoxysilanes, which will provide the proper kinds of organosilyl units, can be used to treat the substrate.

A second method is that of reacting a silica hydrogel or organogel with the proper reactive organosilicon compounds. In general, this method entails precipitating silica from an alkali metal silicate solution to form a silica hydrogel and thereafter treating the gel with a reactive organosilane or organosiloxane compound such as a chlorosilane, silanol, alkoxysilane or a siloxane. When a siloxane is employed, treatment should be carried out under acidic conditions which insure complete reaction of the organosilicon compound with the silica.

A third method is that of treating a silica hydrogel or a mixture of a hydrogel and aerogel with isopropanol and a siloxane until the water in the gel is replaced by the siloxane. The water is then separated and the alcohol and excess siloxane are removed from the gel.

At least 10 parts by weight of filler per 100 parts of organosilicon polymer must be used to obtain a satisfactory elastomer. Depending on the particular filler used, best results are obtained when 30 to 100 parts of filler are used. The filling power of these fillers will vary depending on such factors as particle size and degree of agglomeration. The amount of filler that is used will also depend upon the polymer that is used. In general, the viscosity of the polymer and the desired amount of filler are in an inverse ratio to each other.

If desired, small amounts of fillers having surface areas less than 100 square meters per gram, such as diatomaceous earth, can be used as extenders in combination with the above defined fillers.

At least 0.1 percent by weight based on the weight of polymer of cyanoguanidine (dicyanodiamide) is used as curing agent for these compositions although there is no inoperative upper limit. From 0.25 to 1 part of cyanoguanidine is preferred for most compositions.

As indicated in Table II, an excellent elastomer is obtained when from 0.01 to 2.0 percent by weight based upon the weight of polymer of any organic peroxide is used in combination with cyanoguanidine. If only a very small amount of peroxide (e.g. from 0.01 to 0.2 percent) is used in combination with the cyanoguanidine, higher tear strengths are often obtained with certain rubber stocks (e.g. those rubber stocks not containing a silicate) than when either curing agent is used alone. Examples of organic peroxides that can be used in combination with cyanoguanidine are: tert-butylperbenzoate, benzoyl peroxide, dicumyl peroxide, bis(2,4-dichlorobenzoyl)peroxide and 2,5-dimethyl-2,5-di-t-butylperoxy hexane. From 0.03 to 0.06 part of such curing agents is preferred. It should be pointed out that excellent results are obtained when cyanoguanidine is the only curing agent used.

From 0.1 to 50 perecnt by weight of any of the following silicates can also be included in the rubber stock. These silicates include orthosilicates in which the hydrocarbon radicals are monovalent aliphatic hydrocarbon radicals of less than 7 carbon atoms. Examples of such orthosilicates are methylorthosilicate, ethylorthosilicate, n-propylorthosilicate, pentylorthosilicate, allylorthosilicate, pentenylorthosilicate, hexylorthosilicate, and diethyldipropylorthosilicate.

Partial hydrolyzates of orthosilicates are commonly known as polysilicates. Specific examples of such silicates are methylpolysilicate, ethylpolysilicate, isopropylpolysilicate, and n-butylpolysilicate.

These silicates include compounds of the formula $Z_{4-m}Si(OCH_2CH_2OZ')_m$ in which Z is a monovalent aliphatic hydrocarbon radical of less than 7 carbon atoms and Z' is a monovalent aliphatic hydrocarbon radical of less than 6 carbon atoms and $m$ has a value of from 3 to 4. Thus Z' can be any of such groups as methyl, ethyl, isopropyl, tert-butyl, pentyl, vinyl allyl methallyl and butadienyl. The silicate is produced by reacting a chlorosilane with the corresponding monoethers of ethylene glycol or mixtures thereof to produce HCl and the silicate. The monoethers of ethylene glycol are produced by the normal ether reactions of the corresponding alcohols (Z'OH) with ethylene glycol in a 1:1 addition. It is possible then to have more than one specie of the group —(OCH$_2$CH$_2$OZ') on each silicate silicon.

The silicate component can be one silicate or any combination of the silicates described above. It should be remembered that the silicate component is an optional ingredient. The silicates are used primarily to improve the thermal stability of the elastomer and to aid in the cure of the stock. The preferred silicate is ethylpolysilicate.

The compositions of this invention can contain other additives such as compression set additives thermal stabilizers, oxidation inhibitors, plasticizers, pigments and other material commonly employed in organosilicon rubbers. Care must be taken, however, that these additives be at least as heat-stable as the base composition. Small quantities of hydroxylated resins can also be included in these compositions.

The compositions of this invention are cured merely by heating to a temperature sufficient to cause vulcanization. Press vulcanization is an effective method of curing these stocks. Usually a temperature of from 160° to 200° C. for 10 to 15 minutes is sufficient. An aftercure at 200° to 250° C. for 1 to 24 hours is also usually desirable.

Since air does not inhibit vulcanization of these stocks they can be vulcanized in an air oven to give an even cure throughout the section. These compositions can also be vulcanized in an autoclave.

By using hot air vulcanization and a large quantity of cyanoguanidine, a tough sponge is obtained. This vulcanization is usually carried out at 150° to 200° C. although not required, a blowing agent can be used to aid in making a sponge.

The compositions of this invention give elastomers having excellent physical properties. In particular, these elastomers have unusually high tear strengths. These elastomers can be used any place where conventional siloxane elastomers can be used. These elastomers are especially useful where conventional siloxane elastomers are unsatisfactory beacuse of lack of sufficient tear strength. For example, these elastomers can be used in tire treads.

The use of cyanoguanidine as a curing agent enables the vulcanization of deep sections of rubber having uniform physical properties throughout. Unvulcanized stocks containing this curing agent do not cure appreciably during prolonged storage at room temperature. Excellent elastomers are obtained when these stocks are cured in the presence of air.

The following examples are illustrative only and should not be construed as limiting the invention which is properly delineated in the appended claims.

The strip tear strengths were obtained by using a long rectangular shaped specimen ($\frac{1}{16}$ x $\frac{1}{2}$ x 4 in.) having a razor blade cut 1.5 inches long forming a "trouser leg" type specimen. The strip tear values are expressed as pounds per inch tear strength required to propagate this flaw. This method is described in detail by Revlin and Thomas, J. Poly. Sci., 10, 291 (1953), and Greensmith and Thomas, J. Poly. Sci., 18, 189 (1955). The die B tear strengths were obtained in accordance with ASTM D624–54.

In the examples the following materials were used:

A. A high molecular weight hydroxyl-endblocked dimethylpolysiloxane containing .142 mol percent vinylmethylsiloxane.

B. A hydroxy-endblocked dimethylsiloxane containing 5.5 mol percent diphenylsiloxane.

C. A reinforcing silica formed by transforming sodium silicate in solution to a silica sol in the presence of an ion exchange resin, refluxing said sol with HCl to produce a silica having an average surface area of from 250 to 500 square meters per gram and treating said silica to saturate its surface with trimethylsilyl units through SiOSi bonds. This silica has from 0.08 to 0.1 trimethylsilyl units per SiO$_2$.

D. A reinforcing fume silica having an average surface area of at least 350 square meters per gram, said surface being treated but not saturated with trimethylsilyl units. This silica has from 0.07 to 0.09 trimethylsilyl per SiO$_2$ E. A reinforcing fume silica having an average surface area of at least 350 square meters per gram, said surface being saturated with diphenylmethylsilyl units. This silica has from 0.08 to 0.1 diphenylmethylsilyl units per SiO$_2$.

F. A reinforcing silica formed by transforming silicate in solution to a silica sol in the presence of an ion exchange resin, refluxing said sol with HCl to produce a silica having an average surface area of from 250 to 500 square meters per gram and treating said silica to saturate its surface with dimethylsilyl units through SiOSi bonds.

G. Tertiarybutylperbenzoate.

H. Cyanoguanidine.

I. Ethylpolysilicate.

J. n-Propylorthosilicate.

K. Beta-methoxyethylorthosilicate.

L. A hydroxyl endblocked block copolymer consisting of 75 mol percent $(CH_3)_2SiO$ units and 25 mol percent $O_{.5}(CH_3)_2Si—C_6H_4—Si(CH_3)_2O_{.5}$.

M. A trimethyl-treated reinforcing silica cogel having a surface area of at least 300 square meters per gram and having from 0.08 to 0.1 organosilyl units per $SiO_2$.

N. A hydroxyl endblocked dimethylpolysiloxane.

O. A hydroxyl endblocked dimethylpolysiloxane containing 0.142 mol percent vinylmethylsiloxane and 7.5 mol percent phenylmethylsiloxane.

(6) A hydroxyl endblocked copolymer consisting of 10 mol percent methylchloromethylsiloxane and 90 mol percent dimethylsiloxane.

EXAMPLE 2

This example demonstrates that a silicate (e.g., ethylpolysilicate) can be incorporated into the elastomer and that a combination of peroxide and cyanoguanidine can be used as a vulcanizing agent. The elastomers were prepared in the proportions shown in the following table:

Table II

| | 100 Parts of Siloxane | Parts of Filler | Parts of Vulcanizing Agent | Parts of Additive | Tensile Strength, p.s.i. | Percent Elongation at Break | Strip Tear, p.s.i. | Die B |
|---|---|---|---|---|---|---|---|---|
| 1 | B | 60 C | .5 G | | 2,050 | 520 | 78 | 200 |
| 2 | B | 60 C | .5 H | | 1,630 | 830 | 86 | 219 |
| 3 | B | 60 C | .5 G | 3 I | 1,850 | 400 | 88 | 219 |
| 4 | B | 60 C | .5 H | 3 I | 1,820 | 825 | 133 | 253 |
| 5 | B | 60 C | .5 H and .05 G | | 2,110 | 710 | 104 | 248 |
| 6 | B | 60 C | .5 H and .05 G | 3 I | 2,005 | 705 | 119 | 240 |
| 7 | A | 60 C | .5 H | 3 K | 1,775 | 865 | 111 | 262 |
| 8 | A | 60 C | .5 H | 3 J | 1,950 | 900 | 112 | 268 |
| 9 | N | 60 C | .5 H | 3 I | 1,842 | 910 | 121 | 272 |
| 10 | O | 60 C | .5 H | 3 I | 1,480 | 927 | 102 | 215 |
| 11 | O | 60 C | 1. H | 5 I | 1,395 | 930 | 93 | 216 |

EXAMPLE 1

The improved physical properties obtained when cyanoguanidine is used as a vulcanizing agent in place of tertiarybutylperbenzoate are shown in Table I. The elastomers were prepared in the proportions shown in the following table. Samples 1 and 4 were press vulcanized for 10 minutes at 150° C. Samples 2 and 3 were press vulcanized for 10 minutes at 185° C. Samples 1, 2 and 3 were aftercured for one hour at 150° C. and then for 4 hours at 250° C.

Table I

| | 100 Parts of Siloxane | Parts of Filler | Parts of Vulcanizing Agent | Parts of Additive | Tensile Strength, p.s.i. | Percent Elongation at break | Strip Tear, p.s.i. |
|---|---|---|---|---|---|---|---|
| 1 | A | 60 C | .5 G | 3 I | 1,758 | 440 | 71 |
| 2 | A | 60 C | .25 H | 3 I | 1,875 | 770 | 108 |
| 3 | A | 60 C | .1 H | 3 I | 1,875 | 810 | 108 |
| 4 | A | 60 C | 20 H | 3 I | 805 | 800 | |

An excellent sponge was obtained by curing sample number 4 in an air-circulating oven at 150° C. for 20 minutes in place of vulcanizing the sample in a press. This sponge had a tough skin which was about .010 inch thick.

An excellent elastomer is obtained when any of the following siloxane polymers are substituted for the polymer in sample 2, Table I:

(1) A hydroxyl endblocked copolymer consisting of 50 mol percent diphenylsiloxane and 50 mol percent dimethylsiloxane.

(2) A hydroxyl endblocked copolymer consisting of 25 mol percent 3,3,3-trifluoropropylmethylsiloxane and 75 mol percent dimethyl siloxane.

(3) A hydroxyl endblocked copolymer consisting of 25 mol percent butylmethylsiloxane and 75 mol percent dimethylsiloxane.

(4) A hydroxyl endblock copolymer consisting of 10 mol percent methyloctadecylsiloxane and 90 mol percent dimethylsiloxane.

(5) A hydroxyl endblocked copolymer consisting of 10 mol percent methylcyclohexylsiloxane and 90 mol percent dimethylsiloxane.

Samples 1 through 6 were heated for two hours at 200° C. prior to the addition of the vulcanizing agent. The vulcanizing agent was then added and the sample was press vulcanized for 10 minutes at 185° C. and aftercured for 1 hour at 150° C. and then for 4 hours at 250° C.

When any of the following peroxide catalysts are substituted for the tertiarybutylperbenzoate in sample 5 of Table II, an elastomer with good physical properties is obtained. The amounts are stated in parts by weight based on the weight of the siloxane.

(1) 0.01 part tertiarybutylperbenzoate
(2) 1.0 part tertiarybutylperbenzoate
(3) 2.0 parts tertiarybutylperbenzoate
(4) .05 part di-t-butylperoxide
(5) .05 part benzoyl peroxide
(6) .05 part di-cumylperoxide
(7) .05 part 2,5-dimethyl-2,5-di-t-butylperoxy hexane
(8) .05 part bis(2,4-dichlorobenzoyl)peroxide.

When any of the following silicates are substituted for the ethylpolysilicate in sample 4 of Table II, an excellent elastomer is obtained. The amounts of additive are expressed in parts by weight based upon the weight of the siloxane.

(1) 50 parts ethylpolysilicate
(2) 30 parts n-propylorthosilicate
(3) 10 parts beta-methoxyethylorthosilicate
(4) 3 parts methylpolysilicate
(5) 3 parts n-pentylpolysilicate
(6) 3 parts n-pentylorthosilicate
(7) 3 parts $Si(OCH_2CH_2OCH=CH_2)_4$
(8) 3 parts $Si(OCH_2CH_2OCH_2CH_2CH_2CH_3)_4$ (9) 3 parts PhSi(OCH₂CH₂OCH₃)₃
(10) 3 parts

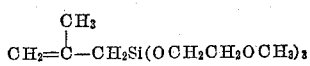

(11) 3 parts CF₃CH₂CH₂Si(OCH₂CH₂OCH₃)₃
(12) 3 parts ethylorthosilicate
(13) 3 parts n-allylorthosilicate

EXAMPLE 3

In this example, cyanoguanidine is used as a vulcanizing agent for rubber stocks containing a variety of fillers. The proportions used and the physical properties of the elastomers are shown in Table III. The samples were press vulcanized for 10 minutes at 185° C. and then aftercured for 1 hour at 150° C. and then for 4 hours at 250° C. Sample 2 was heated for two hours at 200° C. prior to the addition of the vulcanizing agent.

*Table III*

| | 100 Parts of Siloxane | Parts of Filler | Parts of Vulcanizing Agent | Parts of Additive | Tensile Strength, p.s.i. | Percent Elongation at break | Strip Tear, p.s.i. | Die B |
|---|---|---|---|---|---|---|---|---|
| 1 | A | 60 D | .5 H | 3 I | 1,200 | 520 | 87 | 192 |
| 2 | A | 60 E | .5 H | 3 I | 1,160 | 820 | 81 | 270 |
| 3 | A | 60 F | .5 H | 3 I | 1,690 | 990 | 100 | 243 |
| 4 | A | 75 C | .5 H | 3 I | 1,710 | 785 | 131 | 298 |
| 5 | A | 60 M | .5 H | 3 I | 1,910 | 825 | 118 | 265 |

An excellent elastomer is obtained when the filler used in sample 2 of Table III is saturated with any of the following organosilyl groups in place of diphenylmethylsilyl: triethylsilyl, di-n-propylmethylsilyl, dimethylbutylsilyl, phenylmethylsilyl, and dimethyl-3,3,3-trifluoropropylsilyl.

An excellent elastomer is obtained when a filler prepared by the following method is substituted (at a 35 parts filler loading) for the filler in sample 2, Table III; 61.4 g. of a cogel having an average surface area of about 700 square meters per gram and composed of 80 mol percent SiO₂ and 20 mol percent CH₃SiO₁.₅ is stirred for one hour with 230 ml. of isopropanol alcohol and 165 ml. of 38 percent hydrochloric acid, 10 grams of trimethylchlorosilane are added and the mixture is stirred for 1½ hours. The layers are separated and the organic layers are evaporated to dryness. The resulting modified organo filler is heated for 40 hours at 110° C. The resulting material is a powder having (CH₃)₃SiO.₅ units attached through siloxane units to different silicon atoms so that the surface of the substrate is saturated with organosilyl units. This filler has a surface area of about 700 square meters per gram.

When a cogel composed of 50 mol percent SiO₂ and 50 mol percent CH₃SiO₁.₅ is treated by the above method and substituted (at a filler loading of 35 parts per 100 parts of siloxane) for the filler used in sample 2, Table III, an excellent elastomer is obtained.

EXAMPLE 4

100 parts of a hydroxyl endblocked dimethylsiloxane polymer with a viscosity of 2,250 cps. at 25° C., 30 parts of filler (C), 3 parts of ethylpolysilicate and 2 parts of cyanoguanidine were mixed together. The composition was vulcanized in a 150° C. air oven for 45 minutes. An elastic sponge was obtained.

EXAMPLE 5

100 parts of siloxane (A), 15 parts of filler (C), and 10 parts of cyanoguanidine were mixed together. The sample was press vulcanized at 185° C. for 15 minutes. A satisfactory elastomer was obtained.

EXAMPLE 6

In this example, cyanoguanidine is used as a vulcanizing agent for silphenylene containing elastomers. The proportions used and the physical properties of the elastomers are shown in Table IV. The samples were press vulcanized for 10 minutes at 185° C. and then aftercured for 1 hour at 150° C. and then for 4 hours at 250° C.

*Table IV*

| | 100 Parts of Polymer | Parts of Filler | Parts of Vulcanizing Agent | Parts of Additives | Tensile Strength, p.s.i. | Percent Elongation at Break | Strip Tear, p.s.i. |
|---|---|---|---|---|---|---|---|
| 1 | L | 60 C | .5 H | 3 I | 2,730 | 803 | |
| 2 | L | 60 C | .5 H and .5 G | 3 I | 2,517 | 667 | |
| 3 | L | 60 C | .5 H and .5 G | | 2,585 | 747 | |
| 4 | L | 60 C | .5 H | | 2,559 | 970 | |
| 5 | L | 60 C | .5 H and .2 G | 3 I | 2,705 | 853 | 222 |
| 6 | L | 60 M | .5 H | 3 I | 2,816 | 970 | 214 |

EXAMPLE 7

When any of the following organosilicon polymers are substituted for the polymer in sample 1, Table IV, an excellent elastomer is obtained:

(1) A hydroxyl endblocked copolymer consisting of 75 mol percent (CH₃)₂SiO and 25 mol percent O.₅(CH₃)₂SiC₂H₄Si(CH₃)₂O.₅

(2) A hydroxyl endblocked copolymer consisting of 25 mole percent (CH₃)₂SiO and 75 mol percent O.₅(CH₃)₂SiC₆H₄Si(CH₃)₂O.₅

(3) A hydroxyl endblocked copolymer consisting of 80 mol percent (CH₃)₂SiO and 20 mol percent O.₅(CH₃)₂SiCH₂Si(CH₃)₂O.₅

(4) A hydroxyl endblocked copolymer of 75 mol percent (CH₃)₂SiO and 25 mol percent

(5) A hydroxyl endblocked copolymer of 75 mol percent $(CH_3)_2SiO$ and 25 mol percent

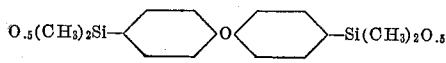

(6) A hydroxyl endblocked copolymer of 75 mol percent $(CH_3)_2SiO$ and 25 mol percent

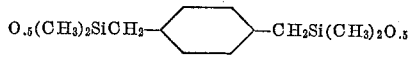

(7) A hydroxyl endblocked $$O_{.5}(CH_3)SiC_6H_4Si(CH_3)_2O_{.5}$$

polymer.

(8) A hydroxyl endblocked $$O_{.5}(CH_3)_2SiC_2H_4Si(CH_3)_2O_{.5}$$

polymer.

That which is claimed is:

1. A heat curable composition of matter consisting essentially of
   (1) hydroxylated organosilicon polymers selected from the group consisting of
      (A) organopolysiloxanes in which the organic groups are selected from the group consisting of monovalent hydrocarbon radicals and halogenated monovalent hydrocarbon radicals, and
      (B) polymers containing units of the structure

wherein X is a divalent radical composed of carbon and hydrogen atoms and no more than one oxygen atom, said oxygen atom being present in a

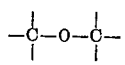

group and Y is a monovalent hydrocarbon radical,
   said organosilicon polymers having a silicon bonded OH content of at least 2 OH per molecule and having an average of from 1.95 to 2.05 monovalent organic groups attached to silicon per silicon atom and having an average of at least 400 silicon atoms per molecule,
   (2) at least 10 percent by weight based on the weight of (1) of a modified silica filler comprising finely divided hydrophobic solid particles having a surface area of at least 100 m.$^2$/g., each of said particles consisting essentially of a polymeric siliceous substrate consisting essentially of
      (A) from 50 to 100 inclusive mol percent of units of the formula $SiO_2$, and
      (B) from 0 to 50 inclusive mol percent of units of the formula $RSiO_{1.5}$, wherein R is selected from the group consisting of alkyl radicals of less than 6 carbon atoms and phenyl, there being
      (C) organosilyl units selected from the group consisting of $R'R''Si=$ and $R'_2R''Si—$, wherein R' is selected from the group consisting of alkyl radicals of less than 6 carbon atoms and phenyl, and R'' is selected from the group consisting of alkyl radicals of less than 6 carbon atoms, 3,3,3-trifluoropropyl and phenyl radicals, in an amount such that the molar ratio of (C) units to total (A) and (B) units is not in excess of 0.6, said organosilyl units being attached to silicon atoms in the surface of said substrate through SiOSi linkages, and
   (3) at least 0.1 percent by weight based on the weight of (1) of cyanoguanidine.

2. The cured, solid, elastic product of claim 1.

3. A heat-curable composition made in accordance with claim 1 wherein the modified silica filler is present in an amount of from 30 to 100 parts by weight per 100 parts of the organosilicon polymer.

4. A heat-curable composition in accordance with claim 1 wherein the hydroxylated organosilicon polymer is an organopolysiloxane in which the organic radicals are monovalent hydrocarbon radicals wherein at least 50 mol percent of the total organic radicals are methyl and wherein the filler substrate is composed of $SiO_2$ units, said substrate being saturated with $R'_2R''Si—$ units, wherein R'' and R' are alkyl radicals of less than 6 carbon atoms with at least 50 mol percent of the total R' and R'' groups being methyl and wherein the modified silica filler is present in an amount of from 30 to 100 parts by weight per 100 parts of the organosilicon polymer.

5. A heat curable composition of matter consisting essentially of
   (1) hydroxylated organosilicon polymers selected from the group consisting of
      (A) organopolysiloxanes in which the organic groups are selected from the group consisting of monovalent hydrocarbon radicals and halogenated monovalent hydrocarbon radicals, and
      (B) polymers containing the units of the structure

wherein X is a divalent radical composed of carbon and hydrogen atoms and no more than one oxygen atom, said oxygen atom being present in a

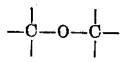

group and Y is a monovalent hydrocarbon radical,
   said organosilicon polymers having a silicon bonded OH content of at least 2 OH per molecule and having an average of from 1.95 to 2.05 monovalent organic groups attached to silicon per silicon atom and having an average of at least 400 silicon atoms per molecule,
   (2) at least 10 percent by weight based on the weight of (1) of a modified silica filler comprising finely divided hydrophobic solid particles having a surface area of at least 100 m.$_2$/g., each of said particles consisting essentially of a polymeric siliceous substrate consisting essentially of
      (A) from 50 to 100 inclusive mol percent of units of the formula $SiO_2$, and
      (B) from 0 to 50 inclusive mol percent of units of the formula $RSiO_{1.5}$, wherein R is selected from the group consisting of alkyl radicals of less than 6 carbon atoms and phenyl, there being
      (C) organosilyl units selected from the group consisting of $R'R''Si=$ and $R'_2R''Si—$, wherein R' is selected from the group consisting of alkyl radicals of less than 6 carbon atoms and phenyl, and R'' is selected from the group consisting of alkyl radicals of less than 6 carbon atoms, 3,3,3-trifluoropropyl and phenyl radicals, in an amount such that the molar ratio of (C) units to total (A) and (B) units is not in excess of 0.6, said organosilyl units being attached to silicon atoms in the surface of said substrate through SiOSi linkages, and
   (3) from 0.01 to 2 percent by weight based upon the weight of (1) of an organic peroxide and at least 0.1 percent by weight based on the weight of (1) of cyanoguanidine.

6. The cured, solid, elastic product of claim 5.

7. A heat-curable composition in accordance with claim 5 wherein the hydroxylated organosilicon polymer is an organopolysiloxane in which the organic radicals are monovalent hydrocarbon radicals, wherein at least 50 mol percent of the total organic radicals are methyl and wherein the filler substrate is composed of $SiO_2$ units, said substrate being saturated with $R'_2R''Si—$ units wherein R' and R'' are alkyl radicals of less than 6 carbon atoms with at least 50 mol percent of the total R' and R'' groups being methyl and wherein the modified silica filler is present in an amount of from 30 to 100 parts by weight per 100 parts of the organosilicon polymer.

8. A heat-curable composition of matter consisting essentially of
 (1) hydroxylated organosilicon polymers selected from the group consisting of
  (A) organopolysiloxanes in which the organic groups are selected from the group consisting of monovalent hydrocarbon radicals and halogenated monovalent hydrocarbon radicals, and
  (B) polymers containing the units of the structure

wherein X is a divalent radical composed of carbon and hydrogen atoms and no more than one oxygen atom, said oxygen atom being present in a

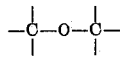

group and Y is a monovalent hydrocarbon radical,
said organosilicon polymers having a silicon bonded OH content of at least 2 OH per molecule and having an average of from 1.95 to 2.05 monovalent organic groups attached to silicon per silicon atom and having an average of at least 400 silicon atoms per molecule,
 (2) at least 10 percent by weight based on the weight of (1) of a modified silica filler comprising finely divided hydrophobic solid particles having a surface area of at least 100 m.$^2$/g., each of said particles consisting essentially of a polymeric siliceous substrate consisting essentially of
  (A) from 50 to 100 inclusive mol percent of units of the formula $SiO_2$, and
  (B) from 0 to 50 inclusive mol percent of units of the formula $RSiO_{1.5}$, wherein R is selected from the group consisting of alkyl radicals of less than 6 carbon atoms and phenyl, there being
  (C) organosilyl units selected from the group consisting of $R'R''Si\equiv$ and $R'_2R''Si—$, wherein R' is selected from the group consisting of alkyl radicals of less than 6 carbon atoms and phenyl, and R'' is selected from the group consisting of alkyl radicals of less than 6 carbon atoms, 3,3,3-trifluoropropyl and phenyl radicals, in an amount such that the molar ratio of (C) units to total (A) and (B) units is not in excess of 0.6, said organosilyl units being attached to silicon atoms in the surface of said substrate through SiOSi linkages, and
 (3) from 0.1 to 50 percent by weight based on the weight of (1) of a compound selected from the group consisting of
  (A) orthosilicates and their partial hydrolyzates in which the hydrocarbon radicals are monovalent aliphatic hydrocarbon radicals of less than 7 carbon atoms, and
  (B) silicates of the formula $$Z_{4-m}Si(OCH_2CH_2OZ')_m$$

in which Z is a monovalent aliphatic hydrocarbon radical of less than 7 carbon atoms, Z' is a monovalent aliphatic hydrocarbon radical of less than 6 carbon atoms and m has a value from 3 to 4 inclusive, and (4) at least 0.1 percent by weight based on the weight of (1) of cyanoguanidine.

9. The cured, solid, elastic product of claim 8.

10. The heat-curable composition of matter in accordance wtih claim 8 wherein the modified silica filler is present in an amount of from 30 to 100 parts by weight per 100 parts of organosilicon polymer.

11. A heat-curable composition in accordance with claim 8 wherein the hydroxylated organosilicon polymer is an organopolysiloxane in which the organic radicals are monovalent hydrocarbon radicals, wherein at least 50 mol percent of the total organic radicals are methyl and wherein the filler substrate is composed of $SiO_2$ units, said substrate being saturated with $R'_2R''Si—$ units wherein R' and R'' are alkyl radicals of less than 6 carbon atoms with at least 50 mol percent of the total R' and R'' groups being methyl and wherein the modified silica filler being present in amount of from 30 to 100 parts by weight per 100 parts of the organosilicon polymer and wherein compound (3) is present in an amount from 0.1 to 15 percent by weight based on the weight of the polymer, said compound (3) being a partial hydrolyzate of an orthosilicate in which the hydrocarbon radicals are alkyl radicals of less than 5 carbon atoms.

12. A heat-curable composition of matter consisting essentially of
 (1) hydroxylated organosilicon polymers selected from the group consisting of
  (A) organopolysiloxanes in which the organic groups are selected from the group consisting of monovalent hydrocarbon radicals and halogenated monovalent hydrocarbon radicals, and
  (B) polymers containing the units of the structure

wherein X is a divalent radical composed of carbon and hydrogen atoms and no more than one oxygen atom, said oxygen atom being present in a

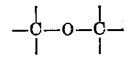

group and Y is a monovalent hydrocarbon radical,
said organosilicon polymers having a silicon bonded OH content of at least 2 OH per molecule and having an average of from 1.95 to 2.05 monovalent organic groups attached to silicon per silicon atom and having an average of at least 400 silicon atoms per molecule,
 (2) at least 10 percent by weight based on the weight of (1) of a modified silica filler comprising finely divided hydrophobic solid particles having a surface area of at least 100 m.$^2$/g., each of said particles consisting essentially of a polymeric siliceous substrate consisting essentially of
  (A) from 50 to 100 inclusive mol percent of units of the formula $SiO_2$, and
  (B) from 0 to 50 inclusive mol percent of units of the formula $RSiO_{1.5}$, wherein R is selected from the group consisting of alkyl radicals of less than 6 carbon atoms and phenyl, there being
  (C) organosilyl units selected from the group consisting of $R'R''Si\equiv$ and $R'_2R''Si—$, wherein R' is selected from the group consisting of alkyl radicals of less than 6 carbon atoms and phenyl and R'' is selected from the group consisting of less than 6 carbon atoms, 3,3,3-trifluoropropyl and phenyl radicals, in an amount such that the molar ratio of (C) units to total (A) and (B) units is not in excess of 0.6, said organosilyl units being attached to silicon atoms in the surface of said substrate through SiOSi linkages,
 (3) from 0.1 to 50 percent by weight based on the weight of (1) of a compound selected from the group consisting of
(A) orthosilicates and their partial hydrolyzates in which the hydrocarbon radicals are monovalent aliphatic hydrocarbon radicals of less than 7 carbon atoms, and
(B) silicates of the formula $$Z_{4-m}Si(OCH_2CH_2OZ')_m$$

in which Z is a monovalent aliphatic hydrocarbon radical of less than 7 carbon atoms, Z' is a monovalent aliphatic hydrocarbon radical of less than 6 carbon atoms and $m$ has a value from 3 to 4 inclusive, and
(4) from 0.01 to 2 percent by weight based on the weight of (1) an organic peroxide and (5) at least 0.1 percent based on the weight of (1) of cyanoguanidine.

13. The cured, solid, elastic product of claim 12.

14. A heat-curable composition in accordance with claim 12, wherein the hydroxylated organosilicon polymer is an organopolysiloxane in which the organic radicals are monovalent hydrocarbon radicals, wherein at least 50 mol percent of the total organic radicals are methyl and wherein the filler substrate is composed of $SiO_2$ units, said substrate being saturated with $R'_2R''Si-$ units wherein R' and R'' are alkyl radicals of less than 6 carbon atoms with at least 50 mol percent of the total R' and R'' groups being methyl and wherein the modified silica filler is present in an amount of from 30 to 100 parts by weight per 100 parts of the organosilicon polymer and wherein compound (3) is present in an amount from 0.1 to 15 percent by weight based on the weight of the polymer, said compound (3) being a partial hydrolyzate of an orthosilicate in which the hydrocarbon radicals are alkyl radicals of less than 3 carbon atoms.

15. The method of making a vulcanized silicone rubber which comprises heating the composition of claim 1 to a temperature sufficient to cause vulcanization.

16. The method of making a vulcanized silicone rubber which comprises heating the composition of claim 4 to a temperature sufficient to cause vulcanization.

17. The method of making a vulcanized silicone rubber which comprises heating the composition of claim 5 to a temperature sufficient to cause vulcanization.

18. The method of making a vulcanized silicone rubber which comprises heating the composition of claim 8 to a temperature sufficient to cause vulcanization.

19. The method of making a vulcanized silicone rubber which comprises heating the composition of claim 12 to a temperature sufficient to cause vulcanization.

References Cited in the file of this patent

UNITED STATES PATENTS 2,938,010    Bluestein _____ May 24, 1960

FOREIGN PATENTS 813,972    Great Britain _____ May 27, 1959